(12) United States Patent
Lee et al.

(10) Patent No.: US 8,947,492 B2
(45) Date of Patent: *Feb. 3, 2015

(54) COMBINING MULTIPLE BIT RATE AND SCALABLE VIDEO CODING

(75) Inventors: Ming-Chieh Lee, Bellevue, WA (US); Tin Qian, Bellevue, WA (US); Timothy Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

This patent is subject to a terminal disclaimer.

(21) Appl. No.: 12/819,092

(22) Filed: Jun. 18, 2010

(65) Prior Publication Data

US 2011/0310216 A1    Dec. 22, 2011

(51) Int. Cl.
*H04N 7/15*     (2006.01)
*H04L 12/18*    (2006.01)
*G06F 15/16*    (2006.01)
*H04N 21/258*   (2011.01)
(Continued)

(52) U.S. Cl.
CPC ........... *H04N 7/15* (2013.01); *H04N 21/25833* (2013.01); *H04N 19/0043* (2013.01); *H04N 19/00436* (2013.01); *H04N 19/00442* (2013.01)
USPC ....... 348/14.08; 348/14.1; 370/254; 370/401; 375/240.01; 375/240.03; 375/240.11; 375/240.12; 375/240.16; 379/202.01; 705/26.41; 705/37; 709/205; 709/218; 709/224; 709/231; 725/95; 725/97; 725/116

(58) Field of Classification Search
CPC .............. H04N 7/15; H04N 21/25833; H04N 19/0043; H04N 19/00436; H04N 19/00442
USPC .................... 348/14.01, 14.08; 370/254, 401; 375/240.03, 240.11, 240.12, 240.16, 375/240.1, 240.01; 379/202.01; 709/218, 709/205, 231, 224; 725/116, 95, 97; 705/26.41, 37, 46, 91
See application file for complete search history.

(56) References Cited

U.S. PATENT DOCUMENTS 5,600,646 A     2/1997   Polomski ...................... 370/263
5,687,095 A *  11/1997   Haskell et al. ............. 348/386.1
(Continued)

FOREIGN PATENT DOCUMENTS

CN          1633652      6/2005
CN          101019459    8/2007
(Continued)

OTHER PUBLICATIONS

Eleftheriadis, E., et al.; "*Multipoint Videoconferencing with Scalable Video Coding*"; Mar. 1, 2006; Layered Media, Inc.; http://www.zju.edu.cn/jzus/downloadpdf.php?doi=10.1631/jzus.2006.A0696;    10 pgs.

(Continued)

*Primary Examiner* — Gerald Gauthier
(74) *Attorney, Agent, or Firm* — Andrew Smith; Jim Ross; Micky Minhas (57) ABSTRACT

Video streams are generated using a combination of Multiple Bit Rate (MBR) encoding and Scalable Video Coding (SVC). Capabilities and requests of the clients are used in determining the video streams to generate as well as what video streams to deliver to the clients. The clients are placed into groups based on a resolution capability of the client. For each resolution grouping, MBR is used for generating spatial streams and SVC is used for generating temporal and quality streams.

20 Claims, 6 Drawing Sheets

(51) Int. Cl.
H04N 19/31 (2014.01)
H04N 19/33 (2014.01)
H04N 19/34 (2014.01)

(56) References Cited

U.S. PATENT DOCUMENTS

| | | | |
|---|---|---|---|
| 5,963,547 A | 10/1999 | O'Neil | |
| 6,091,777 A | 7/2000 | Guetz | |
| 6,229,850 B1* | 5/2001 | Linzer et al. | 375/240.11 |
| 6,501,797 B1* | 12/2002 | van der Schaar et al. | 375/240.12 |
| 6,535,238 B1 | 3/2003 | Kressin | |
| 6,580,754 B1* | 6/2003 | Wan et al. | 375/240.01 |
| 6,584,077 B1* | 6/2003 | Polomski | 370/263 |
| 6,622,171 B2 | 9/2003 | Gupta et al. | 709/231 |
| 7,007,098 B1* | 2/2006 | Smyth et al. | 709/233 |
| 7,034,860 B2* | 4/2006 | Lia et al. | 348/14.09 |
| 7,054,774 B2 | 5/2006 | Batterberry et al. | 702/79 |
| 7,073,073 B2 | 7/2006 | Lisitsa et al. | 710/316 |
| 7,089,285 B1* | 8/2006 | Drell | 709/204 |
| 7,111,316 B1* | 9/2006 | Zahorjan et al. | 725/97 |
| 7,313,593 B1 | 12/2007 | Pulito et al. | 709/204 |
| 7,362,349 B2* | 4/2008 | Nelson et al. | 348/14.08 |
| 7,447,740 B2* | 11/2008 | AbiEzzi et al. | 709/204 |
| 7,536,469 B2* | 5/2009 | Chou et al. | 709/231 |
| 7,543,073 B2* | 6/2009 | Chou et al. | 709/231 |
| 7,734,800 B2 | 6/2010 | Gupta et al. | 709/231 |
| 7,764,632 B2 | 7/2010 | Gray et al. | 370/260 |
| 7,773,672 B2* | 8/2010 | Prieto et al. | 375/240.03 |
| 7,844,992 B2* | 11/2010 | Boyce et al. | 725/95 |
| 7,899,170 B2* | 3/2011 | Jeong et al. | 379/202.01 |
| 7,949,117 B2* | 5/2011 | Jeong et al. | 379/202.01 |
| 8,115,800 B2* | 2/2012 | Murai et al. | 348/14.13 |
| 8,159,970 B2* | 4/2012 | Kim et al. | 370/254 |
| 8,184,720 B2* | 5/2012 | Onur et al. | 375/240.26 |
| 8,243,119 B2* | 8/2012 | Thapa | 348/14.08 |
| 8,243,905 B2* | 8/2012 | Jeong et al. | 379/202.01 |
| 8,269,816 B2* | 9/2012 | Pun et al. | 348/14.1 |
| 8,340,177 B2* | 12/2012 | Ji et al. | 375/240.11 |
| 8,374,238 B2* | 2/2013 | Xiong et al. | 375/240.11 |
| 8,380,790 B2* | 2/2013 | Lee et al. | 709/205 |
| 8,442,108 B2* | 5/2013 | Song et al. | 375/240.03 |
| 2002/0037052 A1* | 3/2002 | Kimura et al. | 375/240.16 |
| 2002/0038374 A1 | 3/2002 | Gupta et al. | |
| 2002/0131496 A1 | 9/2002 | Vasudevan et al. | 375/240.11 |
| 2004/0257434 A1 | 12/2004 | Davis et al. | |
| 2004/0267503 A1 | 12/2004 | Batterberry et al. | |
| 2005/0010638 A1 | 1/2005 | Richardson et al. | |
| 2005/0013309 A1* | 1/2005 | Ravishankar et al. | 370/401 |
| 2005/0049933 A1* | 3/2005 | Upendran et al. | 705/26 |
| 2005/0049957 A1* | 3/2005 | Vakili et al. | 705/37 |
| 2005/0076363 A1* | 4/2005 | Dukes et al. | 725/46 |
| 2005/0122392 A1 | 6/2005 | Johansen et al. | 348/14.09 |
| 2005/0283798 A1* | 12/2005 | Hunleth et al. | 725/37 |
| 2006/0002465 A1* | 1/2006 | Raveendran et al. | 375/240.01 |
| 2006/0047779 A1* | 3/2006 | Deshpande | 709/218 |
| 2006/0067251 A1 | 3/2006 | Hagendorf | 370/261 |
| 2006/0140267 A1 | 6/2006 | He | |
| 2006/0143678 A1 | 6/2006 | Chou | |
| 2006/0245377 A1 | 11/2006 | Jeong et al. | |
| 2007/0022215 A1 | 1/2007 | Singer | |
| 2007/0024705 A1 | 2/2007 | Richter | |
| 2007/0204300 A1* | 8/2007 | Markley et al. | 725/46 |
| 2007/0204311 A1* | 8/2007 | Hasek et al. | 725/91 |
| 2007/0206089 A1 | 9/2007 | Eshkoli et al. | 348/14.02 |
| 2007/0263087 A1 | 11/2007 | Hong et al. | 348/14.13 |
| 2008/0025414 A1 | 1/2008 | Kim et al. | |
| 2008/0043090 A1 | 2/2008 | Wiener et al. | 348/14.09 |
| 2008/0043644 A1 | 2/2008 | Barkley et al. | 370/261 |
| 2008/0046939 A1 | 2/2008 | Lu et al. | 725/90 |
| 2008/0068446 A1 | 3/2008 | Barkley et al. | 348/14.07 |
| 2008/0112336 A1 | 5/2008 | Gray et al. | |
| 2008/0158337 A1 | 7/2008 | Richardson | |
| 2008/0183808 A1 | 7/2008 | Salesky et al. | 709/203 |
| 2008/0195744 A1 | 8/2008 | Bowra et al. | 709/231 |
| 2009/0172170 A1 | 7/2009 | Rey | |
| 2009/0184962 A1 | 7/2009 | Kuriakose | |
| 2009/0231415 A1 | 9/2009 | Moore et al. | 348/14.09 |
| 2009/0315975 A1 | 12/2009 | Wiener et al. | 348/14.09 |
| 2010/0002069 A1 | 1/2010 | Eleftheriadis et al. | 348/14.08 |
| 2010/0008421 A1 | 1/2010 | Gutman et al. | 375/240.16 |
| 2010/0091888 A1 | 4/2010 | Nemiroff | |
| 2010/0149301 A1 | 6/2010 | Lee et al. | 348/14.08 |
| 2010/0153574 A1* | 6/2010 | Lee et al. | 709/231 |
| 2011/0103473 A1* | 5/2011 | Li et al. | 375/240.12 |
| 2011/0310216 A1* | 12/2011 | Lee et al. | 348/14.08 |
| 2013/0007831 A1* | 1/2013 | Wu et al. | 725/116 |

FOREIGN PATENT DOCUMENTS

| | | | |
|---|---|---|---|
| CN | 200953634 | 8/2007 | |
| EP | 1077565 | 2/2001 | |
| EP | 1395000 B1 | 1/2006 | H04L 12/56 |
| JP | 10-155149 | 6/1998 | |
| JP | 2004-260362 | 9/2004 | |
| JP | 2005-333358 | 12/2005 | |
| JP | 2006-060802 | 3/2006 | |
| JP | 2007-124354 | 5/2007 | |
| JP | 2008-288974 | 11/2008 | |
| KR | 10-2004-0069360 | 8/2004 | H04L 29/06 |
| KR | 10-2008-0010841 | 1/2008 | H04L 12/28 |
| RU | 2226320 | 3/2004 | |
| RU | 2282888 | 8/2006 | |
| WO | 98/38798 | 9/1998 | |
| WO | 02/35844 | 5/2002 | |
| WO | 03/027876 | 4/2003 | |
| WO | 03/052613 | 6/2003 | |
| WO | 2005/018231 | 2/2005 | |
| WO | WO2006/010583 | 2/2006 | H04L 29/06 |
| WO | 2006/11659 | 11/2006 | |
| WO | 2007/045526 | 4/2007 | |
| WO | 2007/076486 | 7/2007 | |
| WO | 2008/082375 | 7/2008 | |

OTHER PUBLICATIONS

Shapiro, O.; "H.264/SVC (Scalable Video Coding)—New Video Compression Standard"; May 19, 2009; ISC West & Expo; http://www.isccast.com/podcasts.isc365.com/powerpoint/09ISCWest_D108.pdf; 27 pgs.
Amplesky Communication Technologies Ltd., "Amplesky VM3000 Videoconferencing", (2003-2004), 3 pages.
Feng Wu, et al., "Next Generation Mobile Multimedia Communications: Media Codec and Media Transport Perspectives", China Communications (Oct. 2006), 15 pages.
IVCi, LLC, "Video Conferencing: Systems: Sony: Sony PCS-G50", (2008), 6 pages.
Planet Enterprises Ltd. "Multi Bit-Rate Capture" (2006-2008), 2 pages.
Polycom Inc. "Polycom VideoPlus Continuous Presence," (2004), 2 pages.
RadiSys Corporation "RadiSys Introduces Continuous Presence Video Conferencing Capabilities for Convedia Media Server Family"; (2008), 2 pages.
Office Action mailed Jun. 27, 2011, in U.S. Appl. No. 12/334,969.
International Search Report dated Jun. 3, 2010, issued in PCT Appl. No. PCT/US2009/063697.
International Search Report dated May 28, 2010, issued in PCT Appl. No. PCT/US2009/063739.
Office Action mailed May 23, 2012, in U.S. Appl. No. 12/334,836.
Office Action mailed Feb. 13, 2012, in U.S. Appl. No. 12/334,969.
International Search Report dated Feb. 9, 2012, issued in PCT Appl. No. PCT/US2011/039245.
Office Action mailed May 6, 2013, in CN Appl. No. 200980151554.9, with English translation.
Office Action mailed May 10, 2013, in U.S. Appl. No. 12/334,836.
Office Action mailed Oct. 10, 2013, in RU Appl. No. 2011124074, with English translation.
Search Report issued Oct. 2, 2013, in EP Appl. No. 09835436.8.

(56) References Cited

OTHER PUBLICATIONS

Office Action mailed Nov. 12, 2013, in JP Appl. No. 2011-540747, with English translation.
Office Action mailed Oct. 22, 2013, in RU Appl. No. 2011124036, with English translation.
Office Action mailed Jan. 30, 2014, in CN Appl. No. 200980151554.9, with English translation.
Office Action mailed Jul. 18, 2013, in CN Appl. No. 200980151608.1, with English translation.
Australia Application 2009330646, Office Action mailed Apr. 29, 2014, 3 pages.
Australia Application 2009330648, Notice of Acceptance mailed Mar. 28, 2014, 2 pages.
Chinese Application 200980151608.1, Office Action mailed Mar. 21, 2014, 12 pages.
Japanese Application 2011-540747, Office Action mailed Apr. 1, 2014, 7 pages.
Office Action mailed Feb. 13, 2014, in AU Appl. No. 2009330648, 3 pages.
Office Action mailed Feb. 19, 2014, in AU Appl. No. 2009330646, 3 pages.
Office Action mailed Jan. 21, 2014, in JP Appl. No. 2011-542168, with English translation, 8 pages.
Russian Application 2011124074, Decision on Grant mailed Apr. 4, 2014, 18 pages.
U.S. Appl. No. 12/334,836, Non-Final Office Action mailed Mar. 13, 2014, 28 pages.
Chinese Application No. 200980151554.9, Notice of Allowance mailed May 19, 2014, 4 pages.
U.S. Appl. No. 12/334,836, Amendment and Response filed Jul. 14, 2014, 15 pages.
Australia Application 2009330646, Notice of Acceptance mailed Jul. 10, 2014, 2 pages.
Chinese Appiication No. 200980151608, Third Office Action mailed Oct. 10, 2014, 12 pages.
Taiwan Application No. 98138617, Notice of Allowance mailed Dec. 4, 2014, 4 pages.
U.S. Appl. No. 12/334,836, Non-Final Office Action mailed Dec. 4, 2014, 30 pages.

\* cited by examiner

COMBINING MULTIPLE BIT RATE AND SCALABLE VIDEO CODING

BACKGROUND

Clients participating in video conferencing typically have different processing capabilities and available bandwidth. In some situations, a video conferencing client may have a fluctuating amount of bandwidth while other clients have a stable amount of bandwidth. Some clients may not be able to receive the same quality video stream or encode video streams as other clients. For example, some clients may be able to encode and play back at 1080p resolution (1920×1080 pixels per frame) with a frame rate of 30 frames per second (fps), while other clients may only be able to encode and receive at CIF resolution (352×288) with a 15 fps rate.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Video streams are generated using a combination of Multiple Bit Rate (MBR) encoding and Scalable Video Coding (SVC). Capabilities and requests of the clients are used in determining the video streams to generate as well as what video streams to deliver to the clients. The clients are placed into groups based on a resolution capability of the client. For each resolution grouping, MBR is used for generating spatial streams and SVC is used for generating temporal and quality streams.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
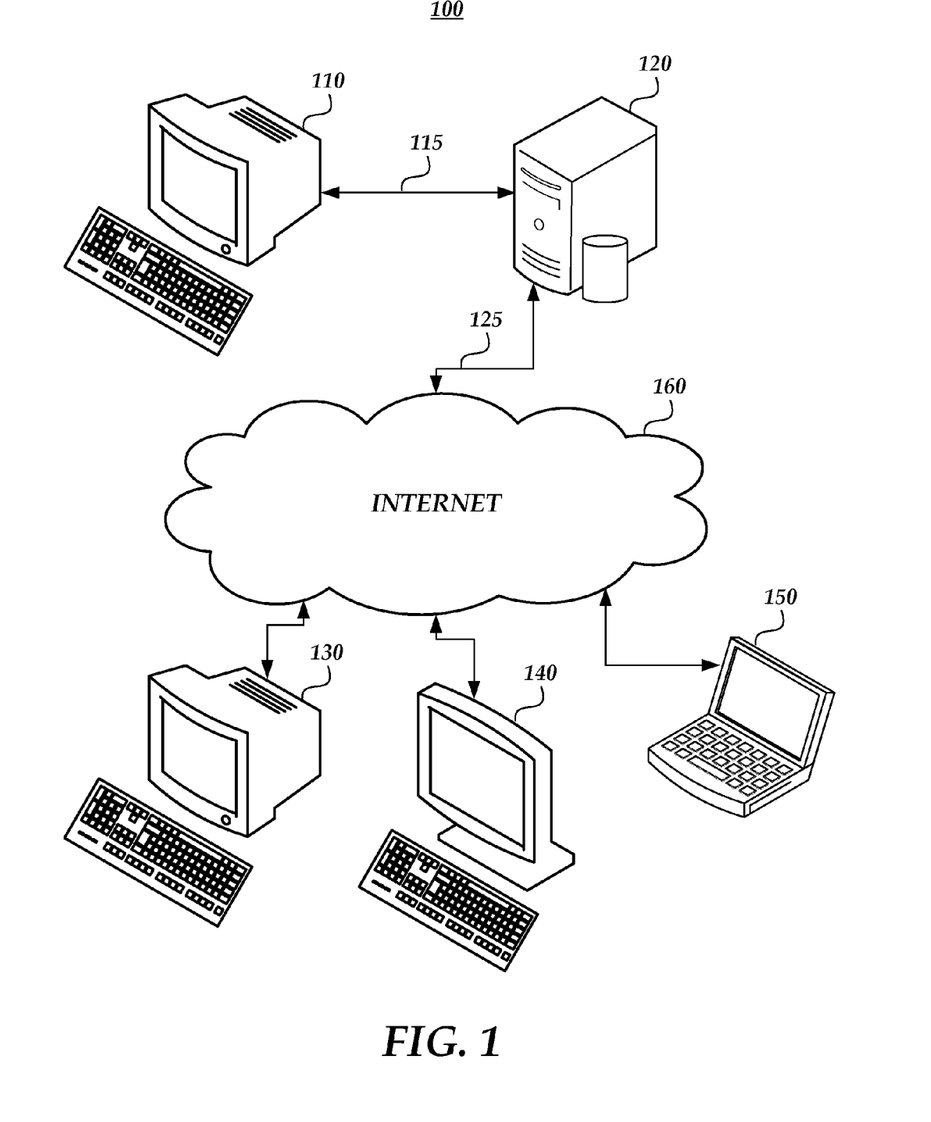
FIG. 1 is a block diagram of an operating environment.

FIG. 1 is a block diagram of an operating environment. The operating environment may comprise a video conference environment 100. Video conference environment 100 may comprise a variety of clients having a variety of capabilities, such as an intranet client 110 and a video conference server 120 connected via an intranet network connection 115. Video conference environment 100 may further comprise a first Internet client 130, a second Internet client 140, and a third Internet client 150. Each of the Internet clients may be connected to video conference server 120 via the Internet 160. Video conference server 120, intranet client 110, first Internet client 130, second Internet client 140, and third Internet client 150 may each comprise a computing device 600, described below in greater detail with respect to FIG. 6.

Video conference environment 100 may be used when multiple clients want to share data streams amongst each other. Each client may connect to video conference server 120. Video conference server 120 may maintain a list of which clients are connected and each client's capabilities. The capabilities may be provided by the clients participating in the video conference and/or obtained by the video conference server. The capabilities for each of the clients may include all or a portion of the following, but are not limited to the: processing power, resolution capability, frame rate, bitrate, connection speed, available bandwidth, camera being used, and the like of a client. The capabilities may be different for some/all of the clients. For example, some clients may be able to encode and play back at lower resolutions (e.g. CIF resolution (352×288) with a rate of 15 frames per second (fps) rate); some at medium resolutions (e.g. VGA resolution (640×480 pixels per frame) with a frame rate of 30 fps); and others at higher resolutions (e.g. 720p and 1080p with a 30 fps rate). Additionally, some of the clients may be able to encode and play back a larger number of streams.

Video conference server 120 may periodically update any changes in the client's capabilities. For example, video conference server 120 may either periodically automatically analyze or manually analyze network connections and determine that a client has more bandwidth available than previously determined. Video conference server 120 may also receive a message from a client that indicates a change in capability and store that information for use in facilitating the generation of the streams and the data sharing. Video conference server 120 may also be configured for determining which clients are responsible for generating data streams and request the generated data streams to be sent to video conference server 120 and/or some/all of the connected clients.

Video conference server 120 is configured to aggregate client capabilities into different groups based on their resolution capability. Each group may include a resolution range that comprises one or more different resolutions and/or a range that consists of only one resolution. For example, there may be a group for 1080p clients; a group for 720p clients and 480p clients; and another group for CIF clients. The clients may also provide video conference server 120 with their desired preferences for viewing and playing video (e.g. full screen mode, full scale mode, small-window mode, bitrate and frame rate).

Video conference server 120 aggregates this information and sends it to each client that is generating streams. For example, there may be CIF, VGA, and HD requests from the clients to the video conference server 120 with CIF's bitrate range of 100 to 250 Kbps with frame rate ranging from 10 to 30 fps, VGA of 500 to 700K with 15 to 30 fps, and HD of 1 to 1.5 Mbps with 30 fps. In this example, video conference server 120 sends the following information: (CIF, 150K to 250K, 10 to 30), (VGA, 500K to 700K, 15 to 30), and (720p, 1M to 1.5M, 30) to each of the clients that are requested to generate streams (e.g. active speaker and/or subscribed streams).

Each client uses this information and its own capability to generate video streams. Video streams are encoded using a combination of Multiple Bit Rate (MBR) coding and Scalable Video Coding (SVC). Scalable Video Coding (SVC) is an extension of the H.264 standard. SVC allows for the transmission and decoding of partial bit streams to provide video services with lower temporal or spatial resolutions or reduced fidelity. SVC, however, can have high encoding and decoding complexity. Among the various scalability modes described by SVC, the spatial and quality scalabilities are the most complex modes to encode and decode. As such, not all of the clients in a video conference are configured to efficiently perform these operations. Most clients, however, are able to efficiently perform other SVC encoding/decoding that is not as complex. Further, the spatial scalability of SVC may not be very efficient when the resolution range is large. MBR encoding, however, is more computationally efficient at spatial scalability. Instead of using only SVC for the video encoding/decoding, aspects of SVC are combined with aspects of a MBR encoding process to lower the complexity of the encoding/decoding of the video. MBR refers to a data stream in which the same content is encoded at several resolutions and/or frame rates to optimize content delivery to one or more clients.

Generally, the clients that are grouped within the higher resolution groups are capable of generating more streams than the clients that are grouped in the lower resolution groups. According to one embodiment, each client generating streams uses MBR for spatial scalability and SVC is used for temporal and quality scalability.

Figure 2:
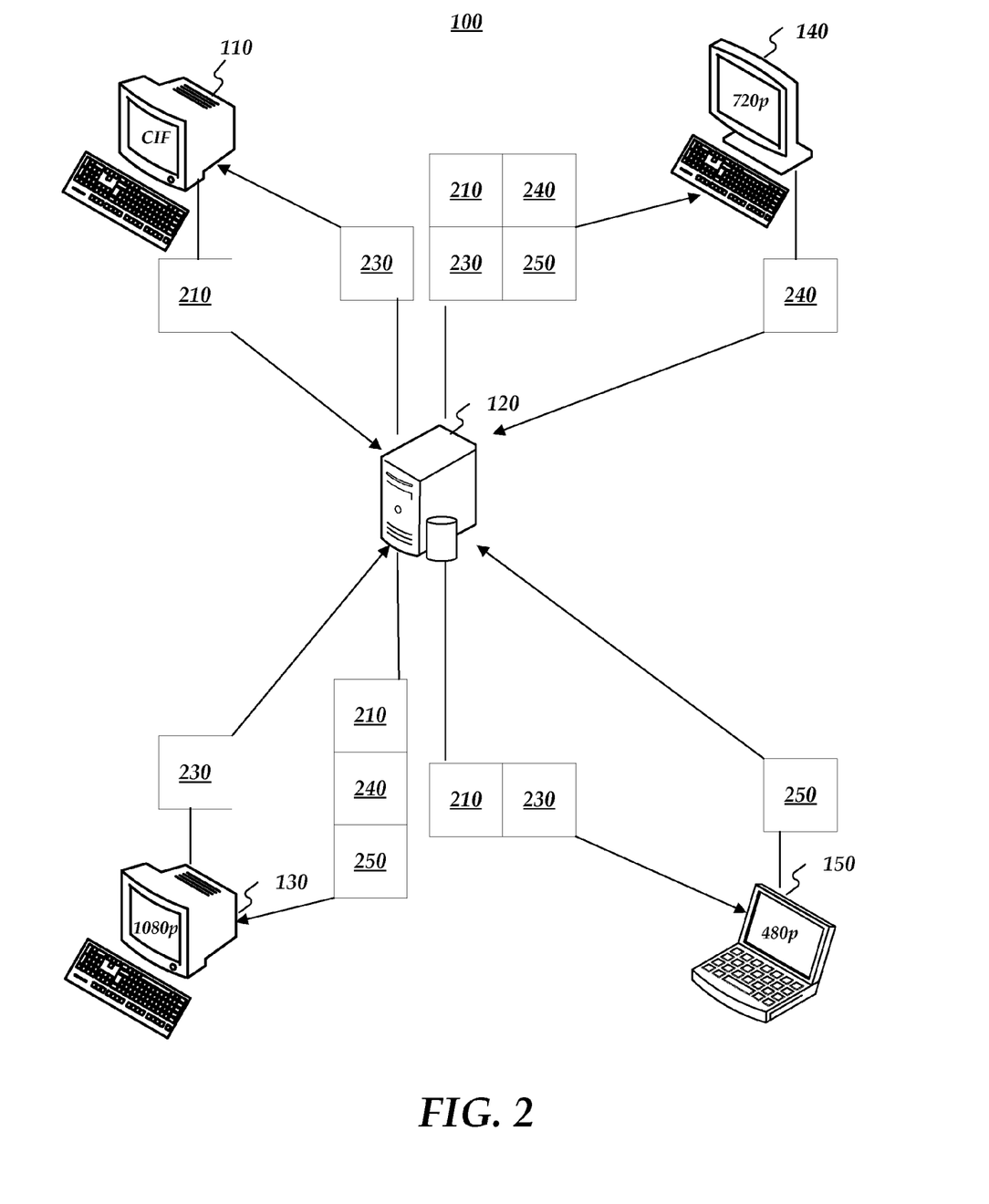
FIG. 2 is a diagram illustrating different clients generating different streams that combine MBR and SVC in a video conference environment.

FIG. 2 is a diagram illustrating different clients generating different streams that combine MBR and SVC in a video conference environment 100.

Each client may generate one or more data streams to send to video conference server 120 and/or some other destination. Each client may have an audio/video input such as a webcam and/or microphone connected to the client. The input may be used in the generation of one or more video streams (that may include audio) and encoding of the video stream(s) before sending it to video conference server 120 and/or some other destination.

For example, client 130 may encode a video stream as a series of video frames comprising a person currently talking. A video stream may be encoded as a series of video frames wherein each frame may comprise a single image. Each frame may be represented by bits of data. The video stream may be encoded so that not every bit of data in every frame needs to be sent in order to represent the source of the video stream. Different frame types may be used to encode and/or compress the video stream. Frame types may comprise I-frames, P-frames, and B-frames. I-frame stands for Intra-Frame, and may comprise a frame that may be decoded by itself without reference to any other frame in a video stream. P-frame stands for Predicted Frame and may be decoded by referencing at least one previous frame in the video stream sequence. B-frame stands for Bidirectional Predicted Frame and may be decoded by referencing at least one previous frame and at least one subsequent frame in the video stream. A client may generate streams that combine MBR and SVC for more than one resolution. For example, client 130 may generate separate streams for 1080p, 720p, 480p, and CIF.

Video conference server 120 is configured to determine the capabilities of the clients and direct the generated streams to the appropriate client(s). For example, video conference server 120 may receive streams of a current speaker that are generated by client 130 at different resolutions and deliver them to the requesting clients. In the current example, video from client 130 is delivered to client 110 at a CIF resolution, client 140 at a 720p resolution, and client 150 at a 480p resolution. Different frame rates/bit rates may be delivered to the clients.

As discussed above, capabilities and requests of the clients are determined by video conference server 120. Generally, the requests relate to the desired manner in which to view the video sources and the capabilities relate to the capability of the device for displaying and encoding/decoding video. In the following example that is intended to be non-limiting, assume that client 110 is a CIF client; client 130 is a 1080p client; client 140 is a 720p client; and client 150 is a 480p client. Video conference server 120 receives the requests and capabilities from each of the clients and aggregates this information before sending it out to the clients that are requested to generate streams. For example, each client may send a subscription request to video conference server 120 that includes the desired viewing parameters as well as capabilities of the client.

The subscription request may include requested parameters such as a source client, a resolution, a bitrate, and/or a frame rate. For example, client 110 may request a subscription to a video stream (230) from client 130 at a CIF resolution at 15 fps and a bitrate of 150 Kbps. A client may also wish to see video streams from all participating clients in the video conference. For example, client 140 may participate in a four client video conference and request to subscribe to video streams (210, 230, 240, 250) showing all four participating clients in 720p with a frame rate ranging from 15 fps to 30 ps and a bitrate ranging from 1 Mbps to 1.5 Mbps. Client 150 may request a subscription to a video stream (210, 230) from client 110 and client 130 shown in 480p using frame rates between 15 fps and 30 fps and a bitrate ranging from 500 Kbps to 700 Kbps. As illustrated, client 130 has requested to subscribe to video streams (210, 240, 250) from client 110, client 140, and client 150 shown in 1080p at 30 fps and a bitrate of 10 Mpbs.

Video conference server 120 aggregates the requests and sends this information to each of the clients that are to generate video streams. In the current example, there are CIF, VGA, and HD requests from the clients to video conference server 120 with CIF's bitrate range of 100 to 250 Kbps with frame rate ranging from 10 to 30 fps, VGA of 500 to 700K with 15 to 30 fps, and HD of 1 to 1.5 Mbps with 30 fps. MCU would then send (CIF, 150K, 15), (VGA, 500K to 700K, 15 to 30), (720p, 1M to 1.5M, 15 to 30), and (1080p, 10M, 30) to all the clients that are requested to generate streams (active speaker and/or subscribed ones).

Each client uses this information and its own capability to generate MBR and SVC streams. According to one embodiment, each client decides how many MBR "groups" to generate. For each MBR group generated there are multiple SVC layers (one base+enhancement layers). Each SVC layer (within each MBR group) is sent as a separate RTP stream. For example, CIF client 110 may be requested to generate a CIF MBR stream and a CIF SVC stream resulting in 4 RTP streams (210). VGA client 150 may be requested to generate 480p streams plus any CIF streams (250). Some VGA clients may be able to generate all of the 480p and CIF SVC streams that result in 10 RTP streams, whereas other clients may only be able to generate a portion of the SVC layers thereby resulting in a lower number of streams generated. Client 140 may be requested to send 720p, 480p, and CIF SVC streams, resulting in a total of 16 RTP streams (240). Client 130 may be requested to send 1080p+720p+480p+CIF SVC streams, resulting in 22 RTP streams (230). For example, 1080p 30 fps SVC stream with 6 layers (3 temporal and 2 quality scalability layers); 720p 30 fps SVC stream with 6 layers; 480p 30 fps SVC stream with 6 layers; and CIF 15 fps SVC stream with 4 layers (2 temporal and 2 quality).

Client 130 may send the streams 230 that it generates to video conference server 120. Client 140 may send the streams 240 that it generates to video conference server 120. Client 150 may send streams 250 that it generates to video conference server 120 and client 110 may send the video streams 210 it generates to video conference server 120. Video conference server 120 directs the received streams to the requested destination(s). Alternatively, a client may send all or a portion of the streams to the video conference server 120 and all or a portion of the streams directly to other destinations.

Each client that is generating streams determines the streams to generate based on the received information from video conference server 120 that includes the SVC and MBR scalability types, range or number of MBR streams and SVC layers, and bitrate for each layer based on the client's capability. According to one embodiment, the bitrate and frame rate ranges are associated with each resolution and the number of streams that are generated are based on the requests from the clients.

The determined stream configurations may change during the video conference. The video conference server 120, or client, may send updated information at any time during the video conference to allow the other clients adapt to the change of conditions/configurations of the clients (such as bandwidth, video viewing mode of a particular stream from big/full screen to sub-window mode, or the addition/removal of clients). According to one embodiment, when there is a status change of a client, the client notifies the video conference server 120. Video conference server 120 then aggregates the information and sends the updated info to the current senders that are being requested to send out streams.

Figure 3:
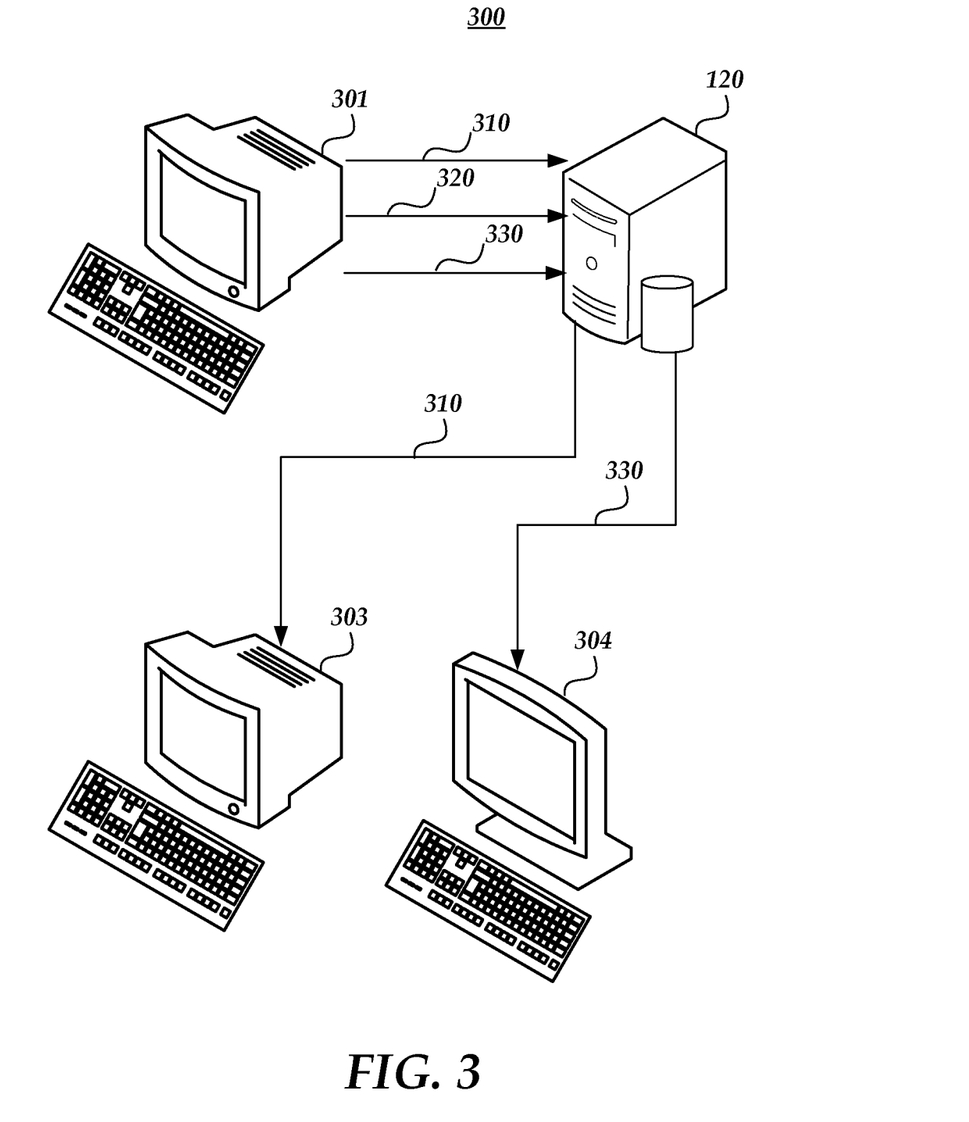
FIG. 3 is a diagram illustrating combining SBC and MBR during video conferencing.

FIG. 3 is a diagram illustrating combining SVC and MBR during video conferencing. As illustrated, video conference system 300 comprises a video conference server 120 and a variety of clients, such as client 301, client 303, and client 304.

Clients in video conference system 300 may connect with different bandwidths and/or different video encoding and/or decoding capabilities. Each client in video conference system 300 may register with video conference server 120 and establish capabilities such as available bandwidth, a maximum encoding resolution, a maximum decoding resolution, and available data encoding and/or decoding algorithms. For example, client 301 may register with video conference server 120 and establish an available bandwidth of 2 Mbps with capability to encode/decode a video stream with VGA (640×480) resolution at 30 fps and CIF (352×288) resolution at 15 fps. Client 303 may register with video conference server 120 and establish an available bandwidth of 150 Kbps with capability to encode/decode a video stream with 720p (1280×720) resolution at 30 fps, VGA (640×480) resolution at 30 fps, and CIF (352×288) resolution at 15 fps. Client 304 may register with video conference server 120 and establish an available bandwidth of 200 Kbps with capability to encode/decode a video stream only at CIF (352×288) resolution at 15 fps.

Clients may be capable of encoding a video stream they may be incapable of decoding, and vice versa. For example, client 304 may be capable of receiving and decoding VGA resolution video streams, but may only be able to encode a CIF resolution video stream. In this scenario, client 301 and client 303 may only encode streams at VGA resolution that video conference server 120 may send to client 304. The CIF resolution encoded video stream from client 304 may be sent to client 301 and client 303.

After a video conference call is established and the capabilities for each client are registered with video conference server 120, video conference server 120 may communicate an encoding request to each client. For example, client 301 and client 303 may be requested to each encode two video resolutions of video streams that combine MBR and SVC and send them to video conference server 120—a first version of the video stream may be encoded as streams with VGA resolution at 30 fps and a second version of the video stream may be encoded as streams with CIF resolution at 15 fps. Client 304 may be requested to encode one set of video streams with CIF resolution at 15 fps. According to one embodiment, the encoding request is placed within a message that includes the aggregated information created from the requests and capabilities of each of the clients.

Video conference server 120 may then receive the stream(s) that are generated from each client and choose at least one received stream to send to other client(s) based on the registered and/or determined capabilities of each client. For example, video conference server 120 may determine that client 304 is only capable of decoding a CIF resolution video stream while client 301 and client 303 are capable of decoding both VGA resolution and CIF resolution video streams. Video conference server 120 may then send the CIF resolution stream generated by client 304 to client 301 and client 303. Video conference server 120 may send the VGA resolution stream generated by client 301 to client 303 and the CIF stream generated by client 301 to client 304. Similarly, video conference server 120 may send the VGA resolution stream from client 303 to client 301 and the CIF stream from client 303 to client 304.

Video conference server 120 may determine whether each client has sufficient bandwidth to receive a video stream and may choose a different stream based on that determination. Consistent with further embodiments of the invention, video conference server 120 and/or one of the clients such as client 303 may periodically re-evaluate the amount of bandwidth available. For example, video conference server 120 may determine that bandwidth available to client 303 has dropped from 150 Kbps to 75 Kbps and may begin sending the CIF resolution video stream instead of the VGA resolution video stream from client 301 to client 303.

Video conference server 120 may also periodically re-evaluate each client's encoding/decoding capabilities, and dynamically alter what encoding algorithms are requested for video streams for each client. The re-evaluation may be performed automatically at predetermined times and/or manually. For example, client 304 may be the only client receiving the CIF resolution video streams from client 301 and client 303. If client 304 drops out of the video conference call, video conference server 120 may request that client 301 and client 303 stop encoding and sending a CIF resolution version of their respective video streams. According to one embodiment, this updated information is sent to each of the clients generating streams as the aggregated information as described above.

Video conference server 120 may instruct at least one of the clients associated with the video conference call to encode a video stream determined to be in-use by one of the other clients associated with the video conference call. For example, video conference server 120 may determine that client 304 is currently using CIF decoding; video conference server 120 may instruct client 303 to encode a CIF resolution stream to send to video conference server 120 that may be relayed to second Internet server 304.

Video conference server 120 may alter a video stream before sending it to a client. For example, client 301 may be capable of encoding and sending video streams at a 720p, VGA, and CIF resolutions and have a large, stable amount of bandwidth available. Client 303 may be capable of receiving and decoding video streams at a 720p, VGA, and CIF resolutions, but have a highly variable amount of bandwidth available. As the bandwidth available to client 303 reduces, video conference server 120 may alter the video stream relayed from client 301 to client 303 as best suited to the available amount of bandwidth.

The choice of streams sent to each client may depend on each client's viewing preferences as well as the client's capabilities. For example, client 303 may be configured to view the other two participants in video conference system 300 side by side, simultaneously, while client 304 may be configured to only show a current speaker. In that case, video conference server may send the VGA resolution stream from client 301 and the CIF resolution stream from client 304 to client 303. Client 304 may alternately receive the CIF resolution streams from client 301 and client 303 as each of those clients speak on the video conference call.

Figure 4:
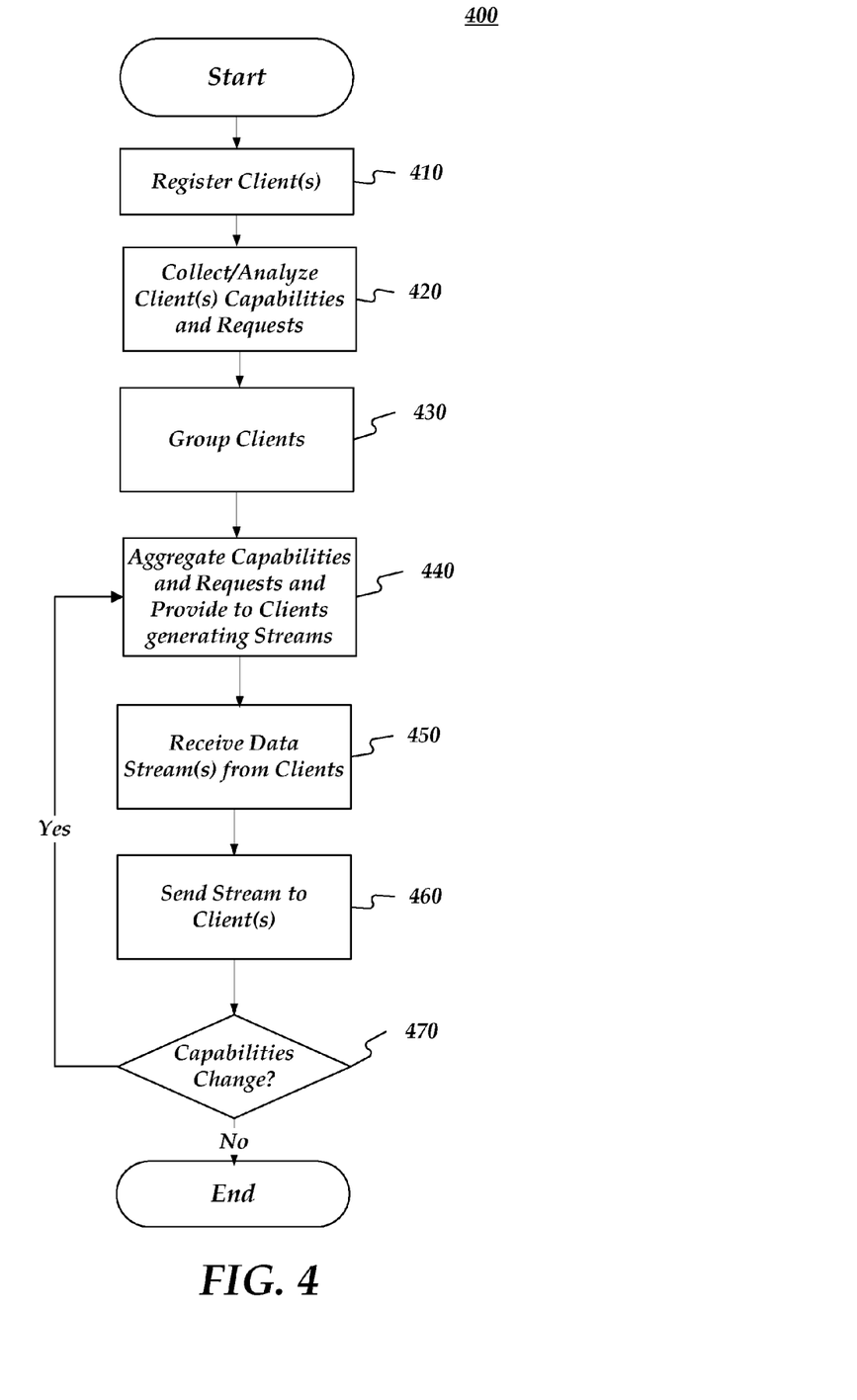
FIG. 4 is a flow chart illustrating a video conference system that combines MBR and SVC in video streams.

Referring now to FIGS. 3-4, illustrative processes for combining MBR and SVC for a video conference will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 4 is a flow chart illustrating a video conference system that combines MBR and SVC in video streams.

After a start block, the operation flows to operation 410, where at least one client is registered. For example, a client may be operatively connected to computing device 600 via a network connection and may request participation in a video conference call hosted by computing device 600.

Moving to operation 420, capabilities and requests of each registered client are collected and/or analyzed. For example, computing device 600 may determine an amount of bandwidth available to each client. Computing device 600 may also determine data processing capabilities for each client, such as video encoding and/or decoding capability and/or data processing speed. Video encoding/decoding capability may include a resolution capability, such as a maximum resolution capability.

A subscription request may also be received from at least one client in the video conference. For example, computing device 600 may receive a subscription request from one client for a VGA encoded, 30 fps stream from a second client. The request may include information such as a desired resolution, bitrate and frame rate. Consistent with embodiments of the invention, computing device 600 may receive multiple subscription requests from any and/or all of the clients participating in the video conference. For example, one client may request lower resolution versions of all the other participating clients; another client may request a high resolution version from whichever client may be designated an active speaker in the video conference and low resolution versions from some or all of the other clients.

Moving to operation 430, the clients are grouped based on their capabilities. According to one embodiment, the clients are grouped according to the resolution they support. For example, clients may be placed into groups relating to standard resolution formats (e.g. 1080p, 720p, VGA, CIF, and the like). Each group may include one or more clients that support a resolution range that comprises one or more different resolutions and/or a range that consists of only one resolution. For example, there may be a group for 1080p clients; a group for 720p clients and 480p clients; and another group for CIF clients.

Flowing to operation 440, the capabilities and requests are aggregated and then sent to at least one client that is requested to generate video streams. The aggregated information may be represented in different ways, such as by creating a vector index having entries of resolution, bitrate range and frame rate range. For example, when there are CIF, VGA, and HD requests from the clients having CIF's bitrate range of 100 to 250 Kbps with frame rate ranging from 10 to 30 fps, VGA of 500 to 700K with 15 to 30 fps, and HD of 1 to 1.5 Mbps with 30 fps, the following vector index may be generated: (CIF, 150K to 250K, 10 to 30), (VGA, 500K to 700K, 15 to 30), (720p, 1M to 1.5M, 30). This information is then provided in a message to the clients that are requested to generate streams (active speaker and/or subscribed ones). Each client uses this information and its own capability to generate the proper MBR and SVC streams (See FIG. 5).

Transitioning to operation 450, one or more data streams are received from at least one client that is requested to generate streams. For example, computing device 600 may receive a plurality of streams for one or more resolutions from a client. According to one embodiment, each resolution is represented by an MBR stream and one or more SVC streams.

Flowing to operation 460, streams are sent to at least one client. For example, computing device 600 may send a first resolution of a stream received from a first client to a second client and send a second resolution of a stream received from the first client to a third client. Computing device 600 may also determine that a client does not have sufficient bandwidth to receive a requested high resolution version of a video stream from a second client and computing device 600 may choose a lower resolution version of the video stream to send to the client.

Transitioning to decision operation 470, a determination is made as to whether the capabilities of a client have changed. When the capabilities of a client and/or the requirements of the system have changed, method 400 may return to operation 440 where the aggregated information is updated that represents a request for different video streams to be generated by one or more of the clients. For example, computing device 600 may determine that the only client in a video conference call utilizing CIF decoding has dropped out. Computing device 600 may then request by sending out the aggregated information that any other clients on the video conference call stop generating CIF streams. Consistent with embodiments of the invention, a client's available bandwidth may decrease, and the client may inform computing device 600 of this occurrence. Computing device 600 may choose a lower resolution data stream for that client and/or alter the currently chosen data stream for that client to take the reduced bandwidth into account. This determination may be made periodically throughout the conference.

When the capabilities do not change and the conference call ends, the process flows to an end operation and returns to processing other actions.

Figure 5:
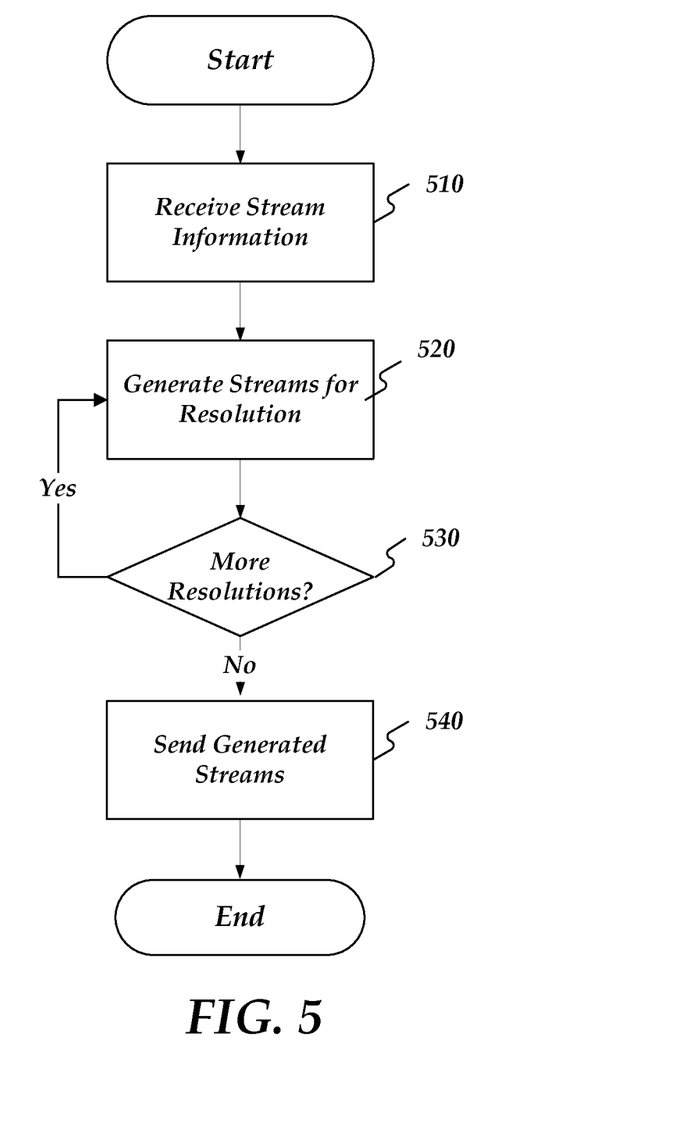
FIG. 5 is a flow chart illustrating the generation of streams that combines MBR and SVC.

FIG. 5 is a flow chart illustrating the generation of streams that combines MBR and SVC.

After a start operation, the process flows to operation 510 where the client receives the aggregated information relating to the desired streams to be generated. According to one embodiment, the aggregated information includes the desired resolutions, bitrates, and frame rates that are grouped according to a resolution. The aggregated information may be received/updated at different times. For example, the information may be received after a client joins a video conference and updated when the conditions of the video conference change. For example, a client may be added/dropped from the video conference, a client's capabilities/requests may change during the video conference, and the like.

Moving to operation 520, the streams for a resolution are generated. The client device determines the MBR streams and SVC layer streams to encode. For example, one 1080p client may encode streams for all of the resolutions that utilize all of the SVC layers, whereas another 1080p client may encode streams for all of the resolutions but only generate streams for a portion of the SVC layers. Generally, a client attempts to encode streams for its supported resolution and any resolutions that it supports that is a lower resolution then its maximum resolution.

Moving to decision operation 530, a determination is made as to whether there are any more resolutions to generate. For example, the client may be requested to generate streams for many different resolutions, such as a 720p resolution video stream, a VGA resolution video stream, and a CIF resolution video stream. When there are more streams to generate, the process returns to operation 520. When there are not more streams to generate, the process flows to operation 540.

At operation 540, the generated streams are sent from the client that created the streams. The generated streams may be sent to a video server and/or to a different destination. For example, a client may send some of the streams to a video server and other streams directly to a client device.

Figure 6:
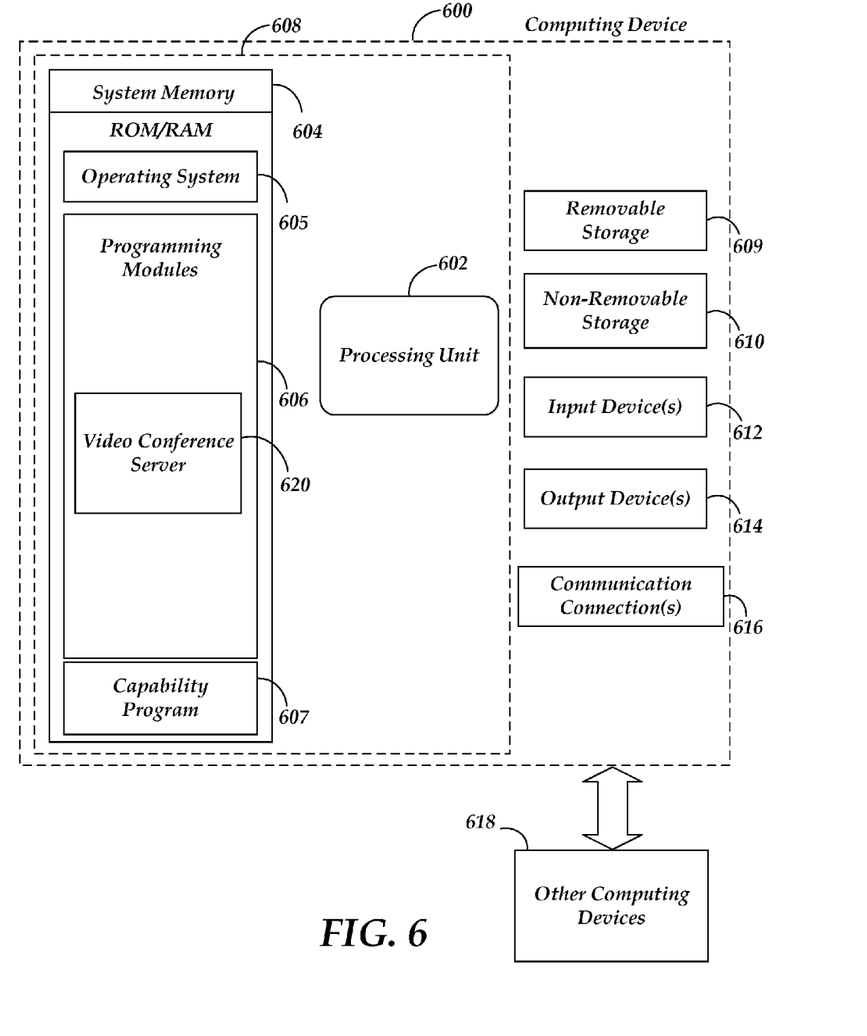
FIG. 6 is a block diagram of a system including a computing device.

FIG. 6 is a block diagram of a system including computing device 600. Consistent with an embodiment of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for system 100 as described above. System 100 may operate in other environments and is not limited to computing device 600.

With reference to FIG. 6, a system consistent with an embodiment of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program 607 relating to determining capabilities and the encoding/decoding of video. Operating system 605, for example, may be suitable for controlling computing device 600's operation. In one embodiment, programming modules 606 may include, for example, a data analysis module and/or a video conference server 620. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610.

The term computer readable media as used herein may include computer storage media. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a camera, keyboard, a mouse, a pen, a sound input device, a touch input device, etc. Output device(s) 614 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Computing device 600 may also contain a communication connection 616 that may allow device 600 to communicate with other computing devices 618, such as over a network in a distributed computing environment, for example, an intranet or the Internet. Communication connection 616 is one example of communication media.

As stated above, a number of program modules and data files may be stored in system memory 604, including operating system 605. While executing on processing unit 602, programming modules 606 (e.g. video conference server 620) may perform processes including, for example, one or more of method stages as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for encoding video streams using a combination of Multiple Bit Rate (MBR) encoding and Scalable Video Control (SVC) encoding, comprising:
    determining a capability associated with clients in a video conference using a processing unit; wherein the capability relates to an ability of each of the clients to encode one or more video streams;
    placing each of the clients into a group using the processing unit that is selected based on the determined capability for each of the clients;
    receiving from at least one of the clients in the video conference different streams at different resolutions that are generated by the at least one of the clients that include an MBR stream that is used for spatial scalability and one or more SVC streams relating to at least one of temporal and quality scalability; and sending at least one of the different streams received from the at least one of the clients in the video conference to at least one of the other clients in the video conference.

2. The method of claim 1, further comprising aggregating capabilities and requests from of each of the clients into a message and providing the message to clients in the video conference that are requested to generate streams within the video conference.

3. The method of claim 1, wherein placing each of the clients into the group comprises determining a supported resolution for each of the clients and grouping the clients according to the supported resolution.

4. The method of claim 1, wherein each layer of a SVC stream is packetized into a separate steam.

5. The method of claim 1, wherein determining the capability associated with each of the clients comprises determining a bandwidth of at least one communication medium associated with each of the clients and determining a processing power for each of the clients.

6. The method of claim 2, wherein the request that is received comprises a desired resolution, a frame rate and a bitrate.

7. The method of claim 1, wherein analyzing the capability associated with each of the clients comprises determining an encoding capability and a decoding capability.

8. The method of claim 2, further comprising determining when conditions change within the video conference and updating the message such that different streams are generated by the one or more clients.

9. The method of claim 1, wherein at least some of the clients have a different resolution.

10. A computer-readable medium, excluding a signal, which stores a set of instructions which when executed performs a method for generating video streams that combine Multiple Bit Rate (MBR) encoding and Scalable Video Coding (SVC), the method executed by the set of instructions comprising:
determining capabilities associated with clients in a video conference; wherein the capabilities include determining for each client: a resolution and an encoding ability;
placing each of the clients into a group that is selected based on the determined resolution for each of the clients;
aggregating the capabilities for the clients into a message;
sending the message to clients that are requested to generate streams for the video conference; and
receiving from the clients in the video conference that are requested to generate streams, streams that include an MBR stream that is used for spatial scalability and one or more SVC streams relating to at least one of temporal and quality scalability, wherein at least one of the client generates streams at different resolutions.

11. The computer-readable medium of claim 10, further comprising aggregating requests from of each of the clients into the message; wherein the requests relate to a viewing request.

12. The computer-readable medium of claim 10, wherein placing each of the clients into the group comprises determining a maximum resolution for each of the clients and grouping the clients according to the maximum resolution.

13. The computer-readable medium of claim 10, wherein each layer of a SVC stream is packetized into a separate steam.

14. The computer-readable medium of claim 10, wherein determining the capability associated with each of the clients comprises determining an available bandwidth for each of the clients.

15. The computer-readable medium of claim 11, wherein the requests comprise a desired resolution, a frame rate and a bitrate.

16. The computer-readable medium of claim 10, wherein determining the capability associated with each of the clients comprises determining a decoding capability.

17. The computer-readable medium of claim 11, further comprising determining when conditions change within the video conference and updating the message such that different streams are generated by the one or more clients.

18. The computer-readable medium of claim 10, wherein at least some of the clients have a different resolution.

19. A system for generating streams that combines Multiple Bit Rate (MBR) encoding and Scalable Video Coding (SVC) encoding in a video conference, the system comprising:
a memory storage;
a network connection device; and
a processing unit coupled to the memory storage, wherein the processing unit is operative to:
register at least one first video conference client and at least one second video conference client operatively connected to the system via the network connection device, wherein being operative to register the at least one first video conference client and the at least one second video conference client comprises being operative to establish capabilities for the at least one first video conference client and the at least one second video conference client, wherein the capabilities comprise: a resolution; a frame rate; and a bit rate;
receive a plurality of video streams at different resolutions from the at least one first video conference client, wherein the plurality of video streams are generated by the first video conference client and comprise a first set of streams that comprise an MBR stream and at least one SVC stream and a second set of video streams that comprise an MBR stream and at least one SVC stream, wherein the at least one first set of streams comprises higher resolution video streams than the second set of video streams.

20. The system of claim 19, further comprising aggregate the capabilities and requests from of each of the clients into a message and provide the message to the clients in the video conference that are requested to generate streams within the video conference.

* * * * *